United States Patent
Cappeller

(10) Patent No.: US 8,246,023 B2
(45) Date of Patent: Aug. 21, 2012

(54) VIBRATION DAMPER, PARTICULARLY FOR SUPPORTING COMPRESSORS, PUMPS, ELECTRIC MOTORS AND THE LIKE

(75) Inventor: Alessandro Cappeller, Cartigliano (IT)

(73) Assignee: Mollificio Cappeller S.R.L., Cartigliano (IT)

( * ) Notice: Subject to any disclaimer, the term of this patent is extended or adjusted under 35 U.S.C. 154(b) by 370 days.

(21) Appl. No.: 12/451,710

(22) PCT Filed: May 29, 2008

(86) PCT No.: PCT/EP2008/056624
§ 371 (c)(1),
(2), (4) Date: Nov. 25, 2009

(87) PCT Pub. No.: WO2008/145699
PCT Pub. Date: Dec. 4, 2008

(65) Prior Publication Data
US 2010/0133733 A1  Jun. 3, 2010

(30) Foreign Application Priority Data
Jun. 1, 2007 (IT) .............................. PD2007A0194

(51) Int. Cl.
*F16F 1/34* (2006.01)
*F16M 5/00* (2006.01)

(52) U.S. Cl. ................... 267/161; 267/140.11; 267/102; 248/593; 248/604

(58) Field of Classification Search .................. 267/102, 267/103, 104, 107, 109, 112, 136, 140.11, 267/141, 158, 160, 161, 162, 163; 248/560, 248/592, 593, 595, 603, 604, 605, 606
See application file for complete search history.

(56) References Cited

U.S. PATENT DOCUMENTS

| | | | |
|---|---|---|---|
| 2,153,605 A | 4/1939 | Williams | |
| 2,960,301 A * | 11/1960 | Roman | 267/158 |
| 3,037,734 A * | 6/1962 | Coyle | 267/162 |
| 3,319,918 A | 5/1967 | Rapata | |
| 5,226,634 A * | 7/1993 | Rudy et al. | 267/160 |
| 5,709,516 A | 1/1998 | Peterson | |
| 6,113,082 A * | 9/2000 | Fujino | 267/103 |
| 2005/0151310 A1 | 7/2005 | Rodeffer | |

FOREIGN PATENT DOCUMENTS

| | | |
|---|---|---|
| DE | 20 2004 017617 U1 | 2/2005 |
| FR | 2 489 900 A | 3/1982 |

* cited by examiner

*Primary Examiner* — Thomas J Williams
(74) *Attorney, Agent, or Firm* — Modiano & Associati; Albert Josif; Daniel O'Byrne

(57) ABSTRACT

A vibration damper, particularly for supporting compressors, pumps, electric motors and the like, comprising a flat body from which at least two engagement tabs protrude on each of the two faces and at least two elastically deformable contact and shock-absorbing portions protrude on at least one of the faces.

14 Claims, 7 Drawing Sheets

VIBRATION DAMPER, PARTICULARLY FOR SUPPORTING COMPRESSORS, PUMPS, ELECTRIC MOTORS AND THE LIKE

The present invention relates to a vibration damper, particularly for supporting compressors, pumps, electric motors and the like.

BACKGROUND OF THE INVENTION

Devices that generate vibrations, such as for example compressors, pumps, electric motors and all devices which contain rotating or otherwise moving parts, are currently supported by vibration dampers, which are designed to cushion the transmission of these vibrations from the vibrating component to the supporting frame and in general to the rest of the structure in which the vibrating device is integrated.

For example, a compressor for refrigerators is generally installed on four dampers by means of a sequence of operations to be performed manually; a known type of damper is shown applied, by way of example, in FIG. 19.

In a first operation, an operator inserts, in a first hole in a plate A jointly connected to the compressor, a vibration-damping annular body B, made of plastic material or rubber, which is arranged so as to surround the rim of the first hole C; a second operator then fits an insert D, which interlocks by way of laterally protruding wings on one side with the base E of the refrigerator and on the opposite side with an extraction-preventing locking cap F, also made of plastic material.

The assembly of these known types of damper is therefore expensive both in terms of components and in terms of labor (three parts to be assembled with respect to each other and to the compressor and the refrigerator).

Further, the installation process is relatively long, and the reverse process for disassembly, to be performed if the compressor has to be subjected to maintenance or repair, is equally long and awkward.

SUMMARY OF THE INVENTION

The aim of the present invention is to provide a vibration damper, particularly for supporting compressors, pumps, electric motors and the like which is capable of obviating the drawbacks revealed by known types of damper.

Within this aim, an object of the present invention is to provide a vibration damper which is extremely quick to assemble and just as quick to remove.

Another object of the present invention is to provide a vibration damper whose performance is not inferior to that of known types of damper.

Another object of the present invention is to provide a damper, particularly for supporting compressors, pumps, electric motors and the like which can be manufactured cheaply with per se known methods.

This aim and these and other objects, which will become better apparent hereinafter, are achieved by a vibration damper, particularly for supporting compressors, pumps, electric motors and the like, characterized in that it comprises a flat body from which at least two engagement tabs protrude on each of the two faces and at least two elastically deformable contact and shock-absorbing portions protrude on at least one of said faces.

BRIEF DESCRIPTION OF THE DRAWINGS

Further characteristics and advantages of the invention will become better apparent from the following detailed description of five preferred but not exclusive embodiments thereof, illustrated by way of non-limiting example in the accompanying drawings, wherein.

DESCRIPTION OF THE PREFERRED EMBODIMENTS

Figure 1:
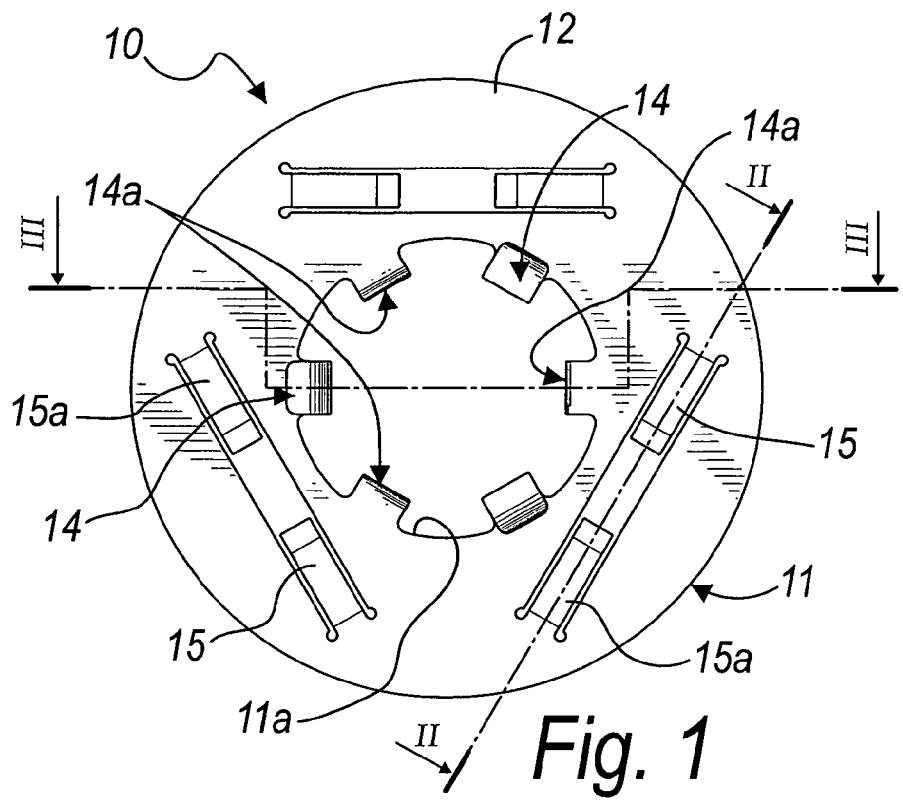
FIG. 1 is a plan view of a first embodiment of a damper according to the invention.
Figure 2:
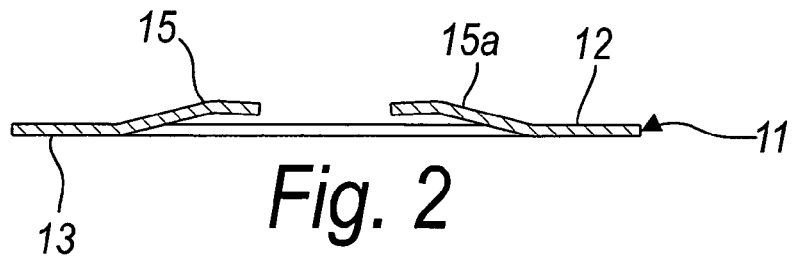
FIG. 2 is a side view, taken along the line II-II shown in FIG. 1.
Figure 3:
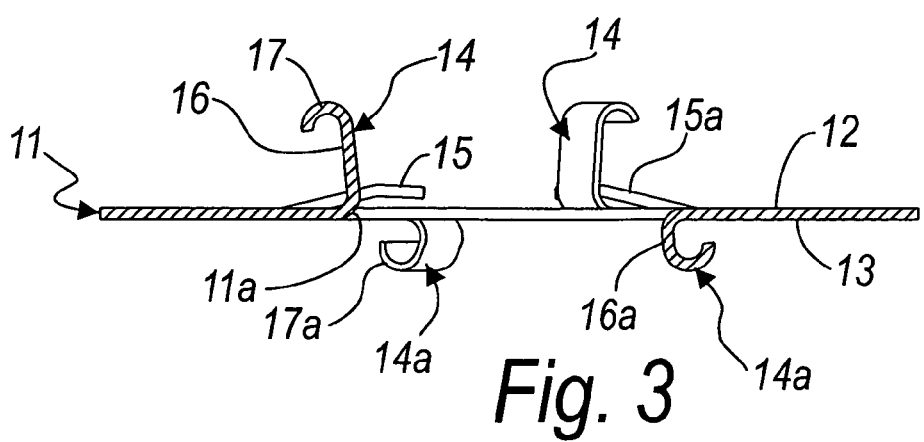
FIG. 3 is a side view, taken along the line shown in FIG. 1.

With reference to the figures, a vibration damper, particularly for supporting compressors, pumps, electric motors and the like according to the invention is generally designated by the reference numeral 10 in the first embodiment, shown in FIGS. 1 to 3.

The damper 10 comprises a plate-like body 11, of which a first face is designated by the reference numeral 12 and a second opposite face is designated by the reference numeral 13.

Three engagement tabs protrude from the plate-like body 11 on each of the two faces 12 and 13; the reference numeral 14 designates the tabs that protrude on the first face 12 and the reference numeral 14a designates the tabs that protrude on the second face 13.

The engagement tabs 14 and 14a protrude substantially at right angles to the respective faces 12 and 13.

The engagement tabs 14 and 14a are each constituted by a portion, respectively 16 and 16a, for extension from the plate-like body 11, and by an engagement end, 17 and 17a respectively, which is folded toward the plate-like body 11.

At least two elastically deformable contact and shock-absorbing portions are further formed on the first face 12.

Such elastically deformable contact and shock-absorbing portions are constituted, in the first embodiment of the invention, by three pairs of blades 15 and 15a, which cantilever out from the first face 12; the blades 15 and 15a of each pair extend symmetrically and oppositely toward each other from the plate-like body 11.

Each of the blades 15 and 15a protrudes from the plate-like body 11 with an inclination of less than 45° with respect to the plane of arrangement of said body.

The free ends of the blades 15 and 15a form the contact points for the vibration-generating device with which the damper 10 is associated.

The vibration damper 10, in this first embodiment thereof, which is in any case a non-limiting example of the invention, has a substantially annular flat body 11.

The tabs 14 and 14a protrude from the inner rim 11a of the plate-like body 11; the first tabs 14, which extend from the first face 12, have an elongation portion 16 which is longer than the portion 16a of the second tabs 14a.

Figure 4:
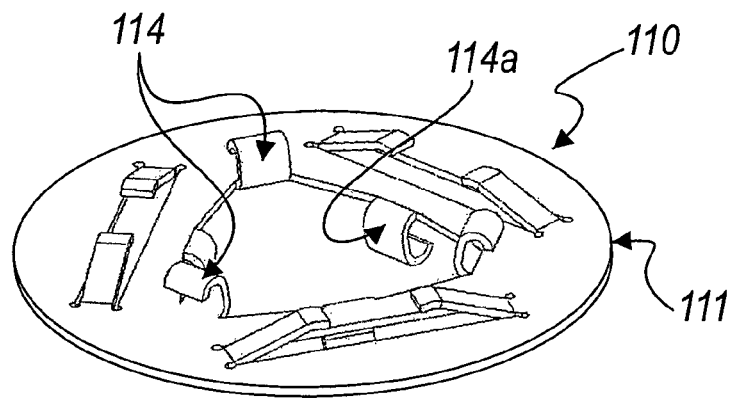
FIG. 4 is a perspective view of a second embodiment of the damper according to the invention.
Figure 5:
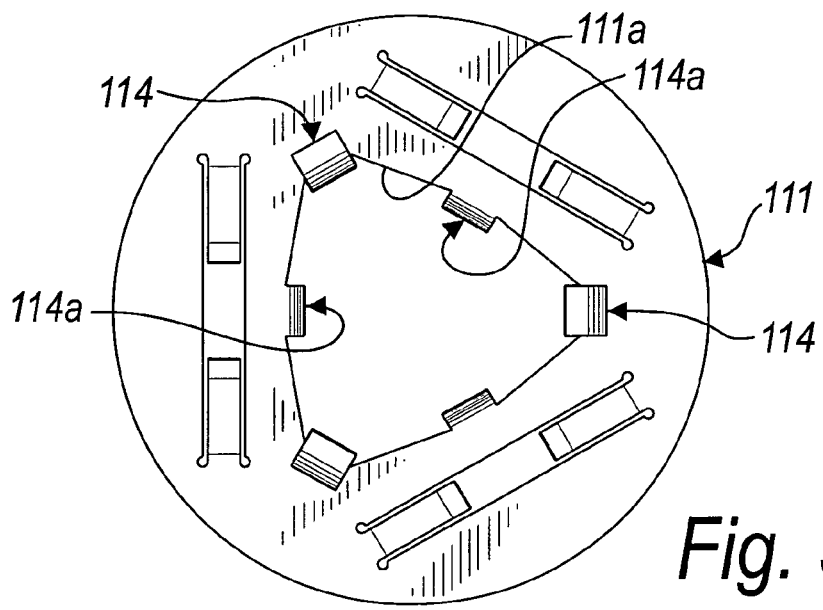
FIG. 5 is a plan view of the damper in the second embodiment of FIG. 4.
Figure 6:
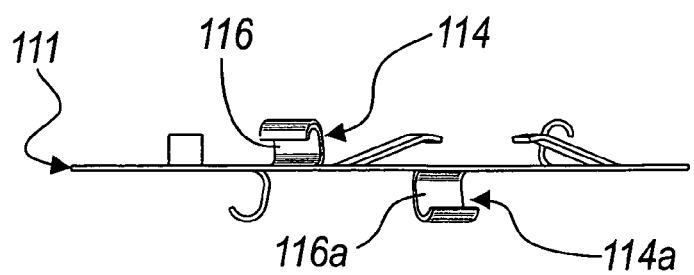
FIG. 6 is a side view of the damper in its second embodiment.
Figure 7:
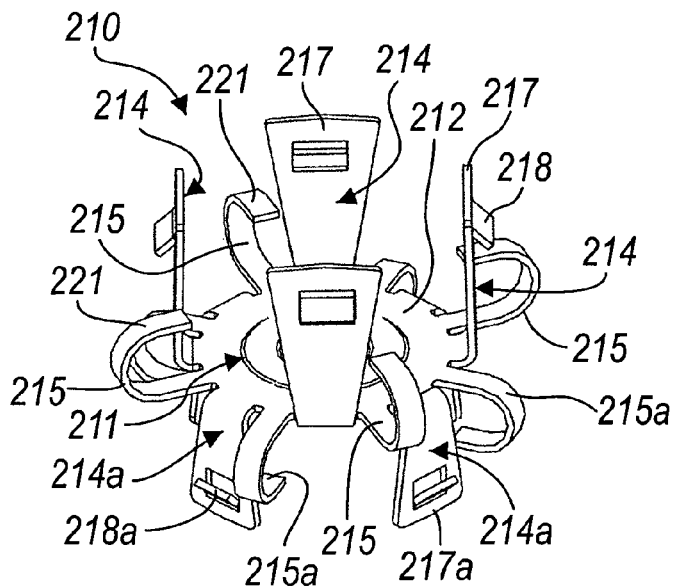
FIG. 7 is a perspective view of the damper according to the invention in a third embodiment thereof.
Figure 8:
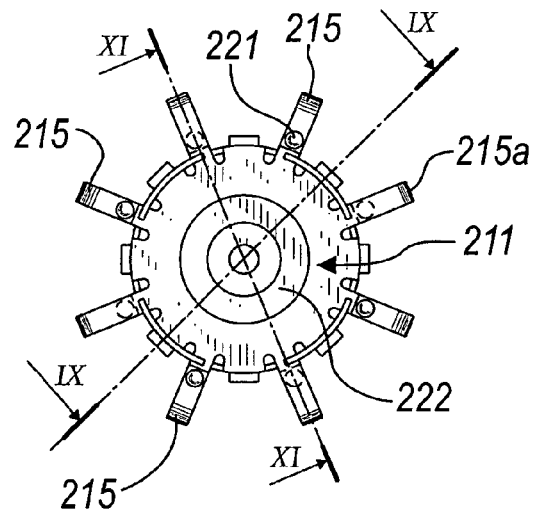
FIG. 8 is a plan view of the damper of FIG. 7.
Figure 9:
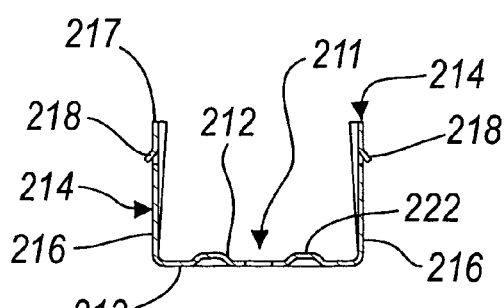
FIG. 9 is a sectional view, taken along the line IX-IX of FIG. 8.
Figure 10:
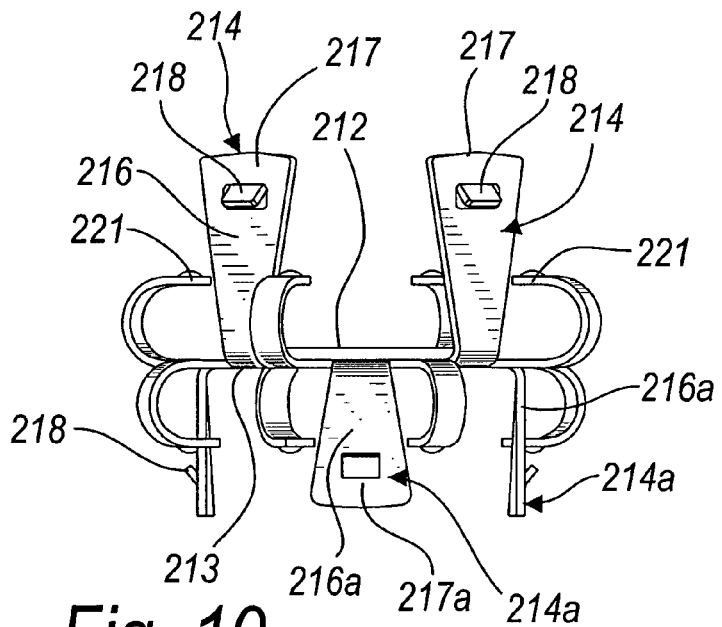
FIG. 10 is a side view of the damper according to the invention in its third embodiment.
Figure 11:
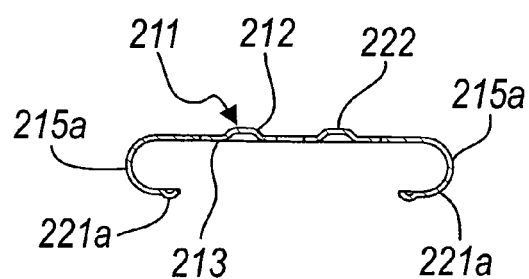
FIG. 11 is a sectional view, taken along the line XI-XI of FIG. 8.

In a second embodiment of the invention, shown in FIGS. 4 to 6, in the damper, designated therein by the reference numeral 110, engagement tabs 114 and 114a extend from the flat body 111, which is annular in this embodiment as well, and have respective elongation portions 116 and 116a of substantially the same length.

In both of the described embodiments, the tabs 14, 14a, 114 and 114a protrude from the body 11 or 111 alternately, i.e., to the side of a first tab 14 or 114 there is a second tab 14a or 114a, and each first tab 14 or 114 is arranged between two second tabs 14a or 114a and vice versa.

The tabs 14, 14a, 114 and 114a are spaced symmetrically on the inner rim 11a or 111a by approximately 60°.

The engagement tabs 14 and 14a and the blades 15 and 15a are monolithic with the flat body 11; the same applies to the damper 110 in its second embodiment.

In the particular embodiments described here by way of non-limiting example of the invention, the damper 10 and 110 is provided by means of operation for cutting, stamping and bending metal plate or other similar and equivalent operations.

The damper 10 and 110 is therefore obtained from a single piece of metal plate.

FIGS. 7 to 12 show a damper according to the invention in a third embodiment thereof, which also is a non-limiting exemplifying embodiment of the invention, and is designated in said figures by the reference numeral 210.

In the third embodiment of the damper 210, the flat body 211 is substantially circular.

Four engagement tabs protrude from the perimetric edges of the flat body 211 on both faces 212 and 213 and substantially at right angles to the faces 212 and 213; the tabs that protrude on the first face 212 are designated by the reference numeral 214 and the tabs that protrude on the second face 213 are designated by the reference numeral 214a.

Figure 12:
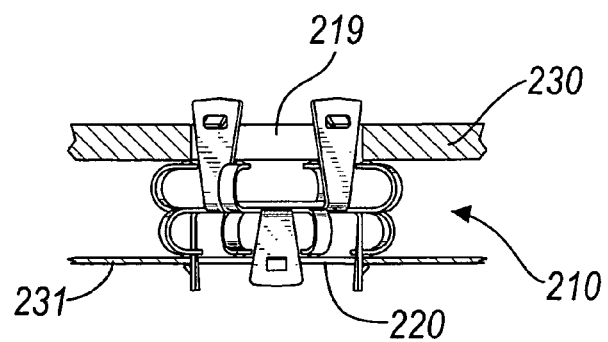
FIG. 12 is a side view of the damper in its third embodiment, applied between a contact base and a supporting plate for a vibration generating device.

The engagement tabs 214 and 214a are each constituted by a portion, respectively 216 and 216a, for protrusion from the flat body 211, and by an engagement end 217 and 217a which is provided with an elastic tooth 218 and 218a for snap engagement with the rim of a hole, 219 and 220 in FIG. 12, in which the tabs 214 and 214a are inserted.

In FIG. 12, the first upper hole 219 belongs to a first plate 230 which is to be considered jointly connected to the vibration-generating device (electric motor, compressor and the like) with which the damper is associated, while the second lower hole 220 is to be considered part of a fixing base 231.

The elastically deformable portions are each constituted by a blade, designated by the reference numeral 215 for the ones directed toward the first face 212 and by the reference numeral 215a for the ones directed toward the second face 213; said blade protrudes radially in a cantilever fashion and is substantially curved in a C-shaped configuration, with the free end, respectively 221 and 221a, which forms a support for a vibration-generating load with which the damper is to be associated.

The damper 210, in this third embodiment, comprises, on each of the two faces 212 and 213, four C-shaped blades 215 and 215a, which protrude symmetrically and oppositely in pairs from the flat body 211.

The flat body 211 has an annular reinforcement ridge 222.

The engagement tabs 214 and 214a and the blades 215 and 215a are monolithic with the flat body 211; this embodiment of the invention also can be provided by a single part of suitably machined metal plate.

Figure 13:
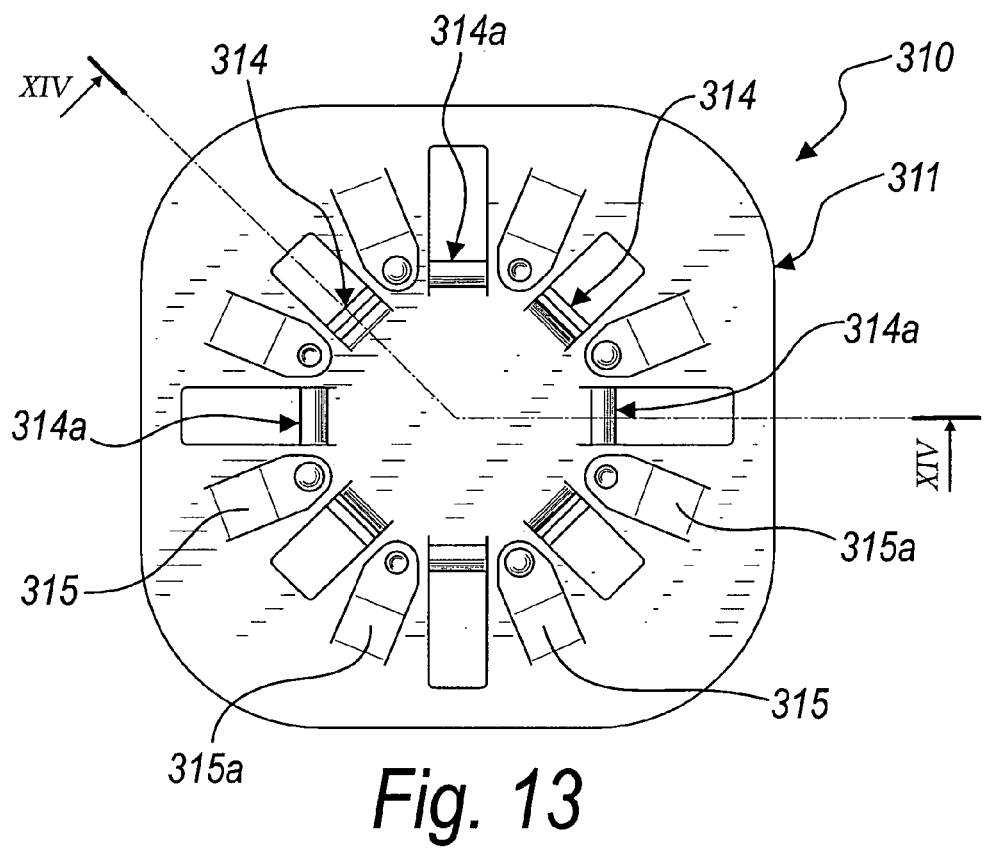
FIG. 13 is a top view of the damper according to the invention in a fourth embodiment thereof.
Figure 14:
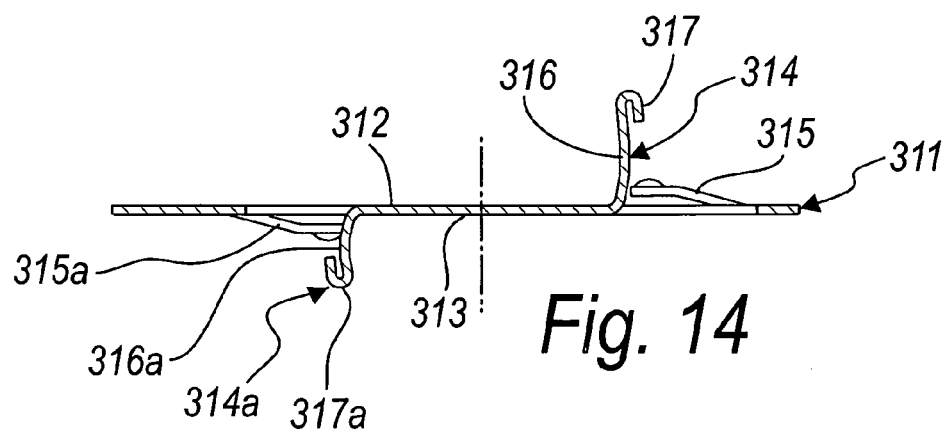
FIG. 14 is a side view, taken along the line XIV-XIV shown in FIG. 13.

In a fourth embodiment of the damper according to the invention, shown in FIGS. 13 and 14 and designated therein by the reference numeral 310, the flat body 311 is substantially a quadrilateral with rounded corners.

Four engagement tabs 314 and 314a respectively protrude from the central region of the flat body 311 on both sides related to the faces 312 and 313 and substantially at right angles to said faces.

The engagement tabs 314 and 314a are each constituted by a portion 316, 316a for extension from the flat body 311 and by a curved engagement end 317, 317a for snap engagement with the rim of a hole in which the tabs 314, 314a are inserted.

The engagement tabs 314, 314a are arranged symmetrically with respect to the axis of the flat body 311, in diametrically opposite positions.

In this fourth embodiment of the invention, each of the elastically deformable portions is constituted by a blade 315, 315a which protrudes in a cantilever fashion from one of the two faces 312, 313 so as to form a suspended contact for a vibration-generating device to be supported.

The blades 315, 315a are arranged in pairs and protrude symmetrically and oppositely toward each other from the flat body 311.

Each of the blades 315, 315a protrudes from the flat body 311 with an inclination of less than 45° with respect to the plane of arrangement of the latter.

Four blades, 315 for the first face 312 and 315a for the second face 313, protrude on each of the two faces 312 and 313; such blades protrude symmetrically and oppositely in pairs from the flat body 311.

The engagement tabs 314 and 314a and the contact blades 315 and 315a protrude from the flat body 311, remaining within its perimeter.

The engagement tabs 314 and 314a and the blades 315 and 315a are monolithic with the flat body 311.

In this fourth embodiment of the invention, as in the third embodiment described above, the elastically deformable contact and shock-absorbing portions are provided on both faces of the body, which is therefore capable of damping vibrations on both sides.

Figure 15:
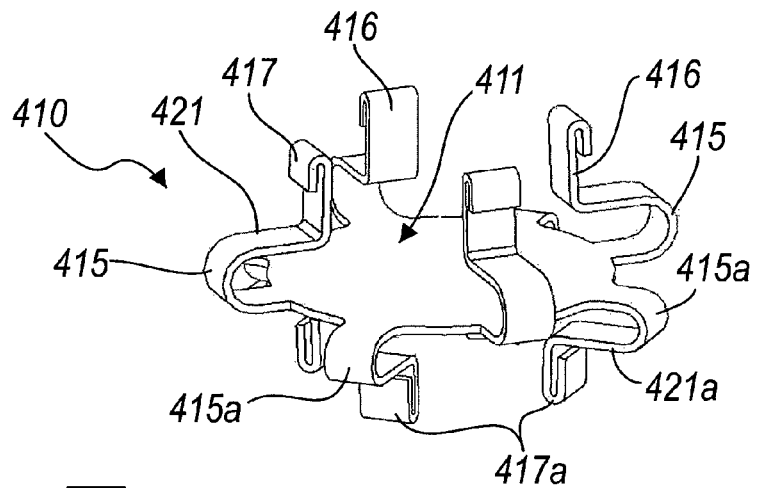
FIG. 15 is a perspective view of the damper according to the invention in a fifth embodiment thereof.
Figure 16:
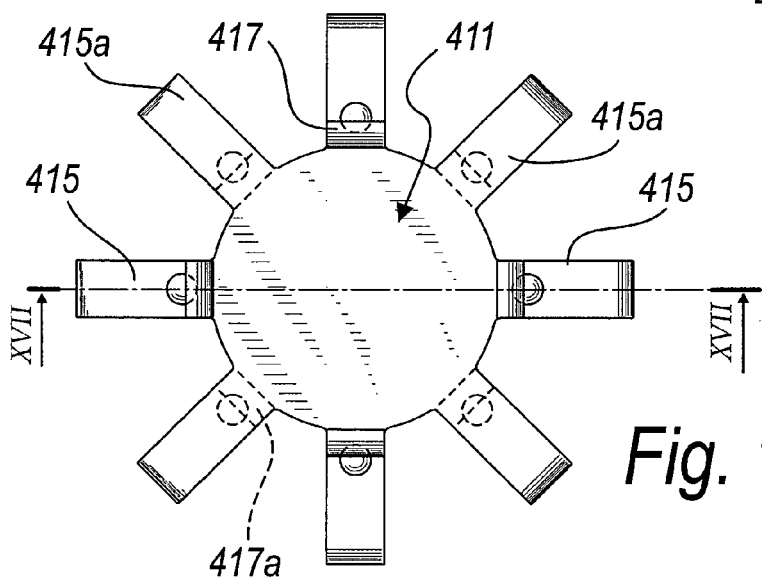
FIG. 16 is a top view of the damper in its fifth embodiment.
Figure 17:
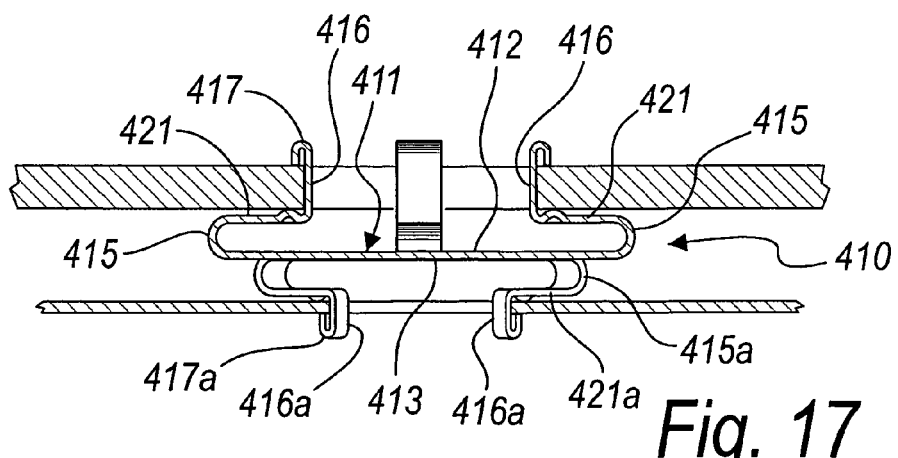
FIG. 17 is a sectional side view, taken along the line XVII-XVII of FIG. 16, of the damper in its fifth embodiment, applied between a base and a supporting plate for a vibration generating device.

In a fifth embodiment of the invention, shown in FIGS. 15 to 17 and designated therein by the reference numeral 410, the flat body 411 is substantially circular.

Each of the elastically deformable portions is constituted by a blade 415 and 415a which is curved substantially in a C-shaped configuration and protrudes radially in a cantilever fashion from the perimetric edge of the flat body 411 and forms, with the recessed portion 421 and 421a, a support for a vibration-generating load with which the damper is to be associated.

Four C-shaped blades, respectively 415 and 415a, are provided on each of the two faces 412 and 413 and extend symmetrically and oppositely in pairs from the flat body 411.

In the fifth embodiment, the engagement tabs 414 and 414a, instead of also protruding from the flat body 411, protrude from the C-shaped blades 415 and 415a, away from the flat body 411.

In the particular embodiment described here, also to be understood as a non-limiting example of the invention, the engagement tabs 414 and 414a are each constituted by a portion 416 and 416a for extension from the recessed contact portion 421 and 421a, and by a curved end 417 and 417a for the snap engagement with the rim of a hole in which the tabs 414, 414a are inserted.

As for the above described previous embodiments, the engagement tabs 414 and 414a are monolithic with the blades 415 and 415a, which in turn are monolithic with the flat body 411.

This embodiment of the damper according to the invention, like the preceding ones, also can be provided by means of operations for cutting, stamping and bending metal plate or other similar and equivalent operations.

Figure 18:
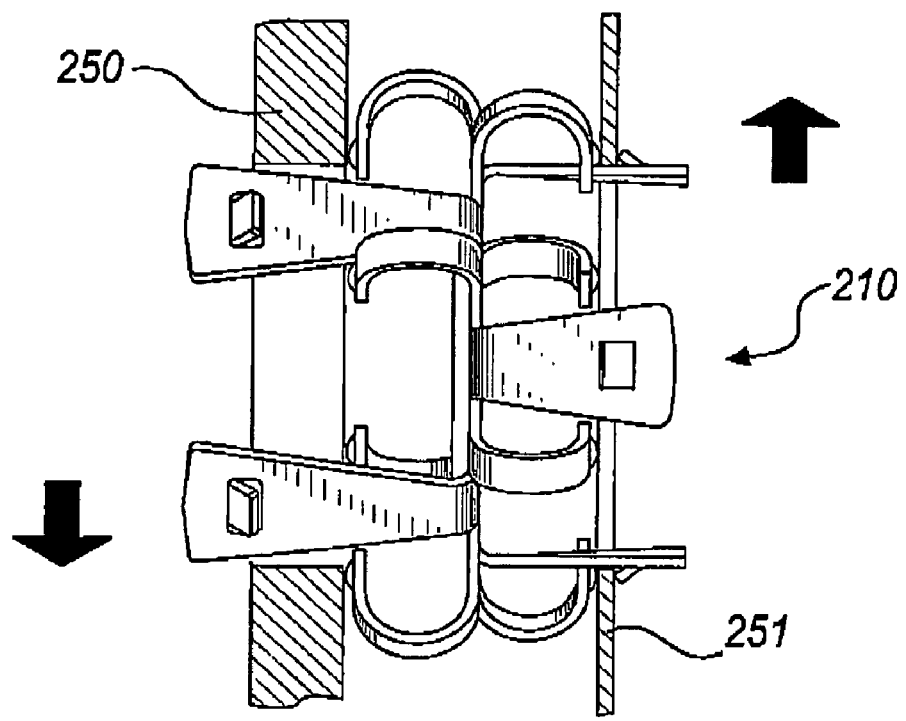
FIG. 18 is a view of an alternative application of the damper according to the invention.
Figure 19:
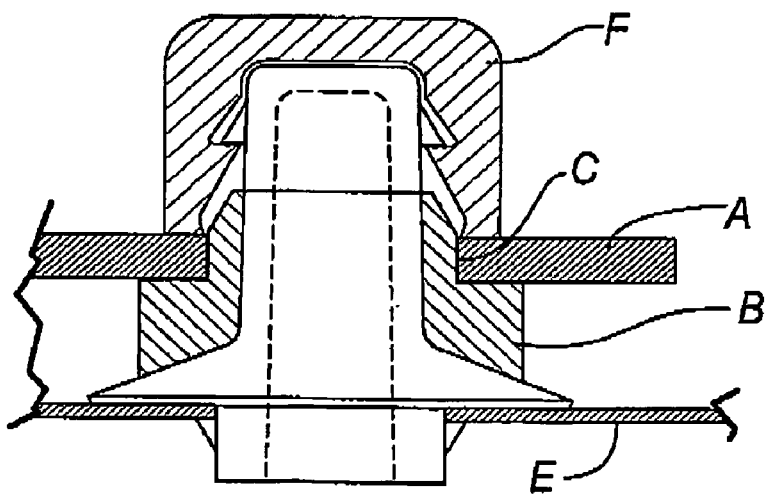
FIG. 19 is a view of an example of the background art.

The invention, in all of its embodiments, can also be applied to support vertical loads, both static and vibratory ones, as exemplified in FIG. 18, where a damper 210 is inserted in a generic wall 250 to support a generic vertical load 251.

The engagement tabs 214 are provided to bear transverse loads and also to act as devices for fixing in the normal configuration for use.

Of course, it must be considered that the damper 10, 110, 210, 310 and 410 according to the invention can be made of other similar and equivalent materials, and with different types of processing; for example, the damper according to the invention can be provided by molding plastic material.

In practice it has been found that the invention thus described achieves the intended aim and objects.

In particular, the present invention provides a vibration damper which is extremely quick to assemble and just as quick to remove; consider for example the damper 210 in its third embodiment: it is in fact necessary and sufficient to push the first engagement tabs 214 into the hole 219 on the plate 230, which is rigidly coupled to the vibrating device, for example the compressor of a refrigerator, and then push the second lower tabs 214a into the hole 220 on the base 231, which is part of the refrigerator.

With just two quick operations, fixing to the compressor and subsequent fixings to the base of the refrigerator, one achieves what is generally provided with known damping devices by means of at least two operators and a sequence of several operations.

Further, for disassembly it is sufficient, by using a screwdriver or another pointed element, to free the teeth 218 and 218a from engagement against the rim of the corresponding holes 219 and 220, flexing elastically the tabs 214 and 214a; as an alternative, the tabs 214 and 214a can be broken easily, in which case the damper must be replaced.

Moreover, the present invention provides a vibration damper whose performance is not inferior to that of known types of damper.

Moreover, the present invention provides a damper, particularly for supporting compressors, pumps, electric motors and the like which can be manufactured cheaply with per se known methods.

The damper according to the invention can in fact be provided by means of a sequence of machinings, of a per se known type, of metal plate.

The low production costs allow the breakage of the tabs of a damper to remove the associated vibrating device from its seat to be considered as an acceptable loss.

The invention thus conceived is susceptible of numerous modifications and variations, all of which are within the scope of the appended claims; all the details may further be replaced with other technically equivalent elements.

In practice, the materials employed, so long as they are compatible with the specific use, as well as the dimensions, may be any according to requirements and to the state of the art.

The disclosures in Italian Patent Application No. PD2007A000194 from which this application claims priority are incorporated herein by reference.

Where technical features mentioned in any claim are followed by reference signs, those reference signs have been included for the sole purpose of increasing the intelligibility of the claims and accordingly such reference signs do not have any limiting effect on the interpretation of each element identified by way of example by such reference signs.

What is claimed is:

1. A vibration damper, particularly for supporting compressors, pumps, and electric motors, the vibration damper comprising a flat body having two faces and from which at least two engagement tabs protrude on each of the two faces and at least two elastically deformable contact and shock-absorbing portions protrude on at least one of said faces, said engagement tabs being each constituted by a portion for extension from the flat body and by an engagement end, which is provided with an elastic tooth for snap engagement with a rim of a hole in which said tabs are to be inserted.

2. The vibration damper according to claim 1, wherein said flat body is substantially annular and three engagement tabs protrude from said annular flat body on both faces and substantially at right angles to said faces.

3. The damper according to claim 2, wherein each of said engagement tabs is constituted by a portion for extension from the flat body and by an engagement end which is folded toward the flat body.

4. The damper according to claim 1, wherein said at least two elastically deformable portions are constituted by three pairs of blades which protrude in a cantilever fashion from one of said two faces, the blades of each pair protruding symmetrically and oppositely toward each other from the flat body.

5. The damper according to claim 1, wherein four engagement tabs protrude from the perimetric edges of said flat body on both sides of the faces and substantially at right angles to said faces.

6. The damper according to claim 1, wherein said at least two elastically deformable portions are each constituted by a blade which protrudes radially in a cantilever fashion and is substantially curved in a C-shaped configuration, with a free end which provides a support for a vibration-generating load with which the damper is to be associated.

7. The damper according to claim 6, comprising, on each of said two faces, four C-shaped blades which protrude symmetrically and oppositely in pairs from the flat body.

8. The damper according to claim 1, wherein said at least two elastically deformable portions are each constituted by a blade, which is curved substantially in a C-shaped configuration and protrudes radially in a cantilever fashion from a perimetric edge of the flat body and forms with a recessed portion a support for a vibration-generating load with which the damper is to be associated.

9. The damper according to claim 8, comprising, on each of said two faces, four C-shaped blades which protrude symmetrically and oppositely in pairs from the flat body.

10. The damper according to claim 9, wherein said engagement tabs extend from said C-shaped blades away from said flat body.

11. The damper according to claim 9, wherein said engagement tabs are monolithic with said blades, which in turn are monolithic with said flat body.

12. A vibration damper, particularly for supporting compressors, pumps, and electric motors, the vibration damper comprising a flat body having two faces and from which at least two engagement tabs protrude on each of the two faces and at least two elastically deformable contact and shock-absorbing portions protrude on at least on of said faces wherein said engagement tabs and said elastically deformable contact and shock-absorbing portions are monolithic with said flat body and said damper being formed from a single piece of metal plate.

13. The damper according to claim 12, wherein it is provided by way of operations for cutting, stamping and bending metal plate or other similar and equivalent operations.

14. A vibration damper, particularly for supporting compressors, pumps, and electric motors, the vibration damper comprising a flat body having two faces and from which at least two engagement tabs protrude on each of the two faces and at least two elastically deformable contact and shock-absorbing portions protrude on at least one of said faces, said engagement tabs being each formed by a portion for extension from a recessed contact portion and by a curved end for snap engagement with a rim of a hole in which said tabs are to be inserted.

* * * * *